BEST AVAILABLE COPY
P. MARTIN.
COTTON SEED HULLER.
No. 3,831. Reissued Feb. 8, 1870.
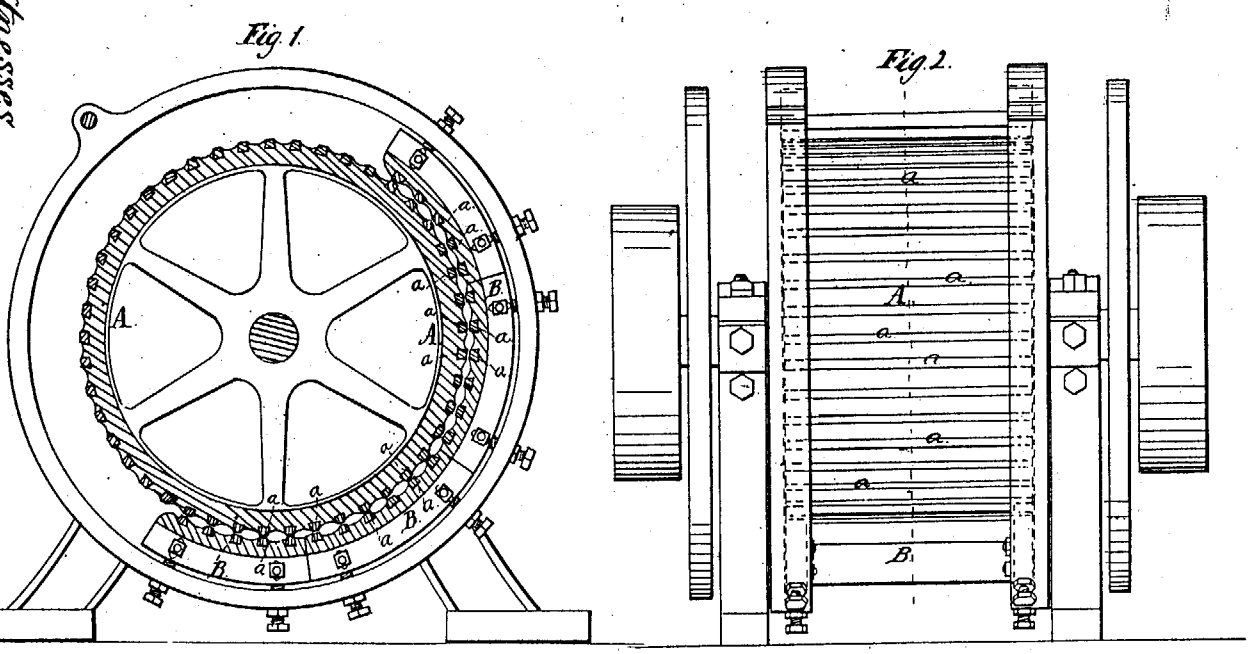
Witnesses
H. W. Coombs
R. S. Spencer
Inventor
P. Martin
Per Munn & Co
attorneys
THE NORRIS PETERS CO., PHOTO-LITHO., WASHINGTON, D. C.

United States Patent Office.

PIERRE PAUL JOSEPH MARTIN, OF PARIS, FRANCE.

*Letters Patent No.* 29,393, *dated July* 31, 1860; *reissue No.* 3,831, *dated February* 8, 1870.

IMPROVEMENT IN COTTON-SEED HULLERS.

The Schedule referred to in these Letters Patent and making part of the same.

*To all whom it may concern:*

Be it known that the following is a full, clear, and exact description of a new and useful Improvement in Machines for Hulling Cotton-Seed, invented by PIERRE PAUL JOSEPH MARTIN, formerly of New Orleans, in the parish of Orleans, and State of Louisiana, but now of Paris, in the Empire of France, reference being had to the accompanying drawing, forming part of this specification, and in which—

Figure 1 represents a vertical cross-section of a mill for hulling cotton-seed, with the improvement which relates to the knives or teeth, as applied to both the runner or cylinder and concave shell Figure 2 is an outside view of said machine at right angles to fig. 1, showing a front view of the hulling-cylinder, with the teeth inserted in its periphery.

Similar letters of reference indicate corresponding parts.

To enable others skilled in the art to make and use the invention, its description will now be proceeded with in reference to the accompanying drawing Prior to this improvement, machines of the class to which it belongs have usually been constructed with a solid cylinder, and concave, the teeth or cutting-edges of which form a part of such devices or castings, and with such machines the cutting-edges soon become dull, and they are rendered useless; besides, the cutting-edges cannot very well be hardened nor repaired when once dull.

To remove these objections is the object of this improvement, which employs separately reversible teeth or cutting-bars made up, for instance, of steel knives, *a*, of a prismoidal shape, as represented by their sections in fig. 1.

These knives or cutting-bars are introduced across the contiguous surfaces of both the hulling-cylinder A and the concave B, preferably by fitting them in or along dovetail grooves, as shown in the drawing.

Between these grooves the working surface of the cylinder, also that of the concave, is scored or furrowed out, so that the knives will have a cutting action on the seed as the cylinder is rotated. Instead of dovetailed grooves, any other suitable shape may be employed with knives of a corresponding shape, but the dovetailed grooves will be found preferable for retaining the knives in place.

The knives *a* are represented as having their sides or surfaces and edges parallel, so that they may be readily taken out of the grooves and turned when occasion requires.

As the surface of these knives wear down, a provision is made for setting up the concave B, and when they are entirely worn out, new pieces can be readily made to supply their places. In this way the machine may be kept in perfect order, and as one edge of the knives gets worn down, they can be reversed and a new edge presented. The separate reversible character of the knives admits of any one or more of them being turned or replaced without disturbing the rest.

The machine should be constructed in such a way as to admit of the change of knives being made expeditiously. The grooves or furrows between each knife *a*, (more distinctly represented in fig. 1,) are well adapted to give the seeds a rolling motion, and to bring them up to the knives or cutting-bars.

The concave B is made up of segments, for the purpose of more readily adjusting it to the cylinder A.

What is here claimed, and desired to be secured by Letters Patent, is—

The prismoidal reversible knives or cutting-bars *a*, in combination with the scored hulling-cylinder A and scored concave B, or either, essentially as and for the purpose herein set forth.

PIERRE PAUL JOSEPH MARTIN.

Witnesses:
F. OLCOTT,
C. F. THIRION.